United States Patent
Page, Jr.

(10) Patent No.: US 6,449,824 B1
(45) Date of Patent: Sep. 17, 2002

(54) MANUALLY MANIPULATED TUBE JARRING AND REMOVING TOOL

(76) Inventor: John Splawn Page, Jr., 22452 Forest Ave., Lake Forest, CA (US) 92630

( * ) Notice: Subject to any disclaimer, the term of this patent is extended or adjusted under 35 U.S.C. 154(b) by 0 days.

(21) Appl. No.: 09/320,867

(22) Filed: May 27, 1999

(51) Int. Cl.[7] ................................................. B23Q 1/00
(52) U.S. Cl. .................... 29/282; 294/102.2; 294/96; 166/301
(58) Field of Search .............................. 294/86.3, 86.31, 294/86.26, 102.1, 102.2, 86.32, 93, 94, 96; 29/278, 280, 281, 426.1, 426.5; 166/98, 301

(56) References Cited

U.S. PATENT DOCUMENTS

| | | | | |
|---|---|---|---|---|
| 1,280,850 A | * | 10/1918 | Paggi | 294/102.1 |
| 1,356,458 A | * | 10/1920 | Moody | 294/102.1 |
| 1,719,533 A | * | 7/1929 | Cady | |
| 2,174,103 A | * | 9/1939 | Driscoll | 294/102.1 |
| 2,468,392 A | * | 4/1949 | Clark | 29/278 |
| 3,576,057 A | * | 4/1971 | Hoy | |
| 4,236,580 A | * | 12/1980 | Bodine | 166/301 |
| 5,451,084 A | * | 9/1995 | Jansch | |
| 5,594,977 A | * | 1/1997 | McCallion | |

* cited by examiner

Primary Examiner—S. Thomas Hughes
Assistant Examiner—Steve Blount

(57) ABSTRACT

A device that is manually manipulated to engage and or grip the inside of a tube sufficiently to transmit an upward pull on a tube to loosen it and remove it from its stuck condition. Its use includes a special METHOD of jarring the tube; a feature that causes high impact upward forces to be transmitted to a tube. This aids tremendously in removing it from severely stuck conditions. The tube referred to is in the pipe extending up from the underground gas tanks at gasoline service stations.

3 Claims, 1 Drawing Sheet

MANUALLY MANIPULATED TUBE JARRING AND REMOVING TOOL

MANUALLY MANIPULATED TUBE JARRING AND REMOVING TOOL

Figures 1, 2:
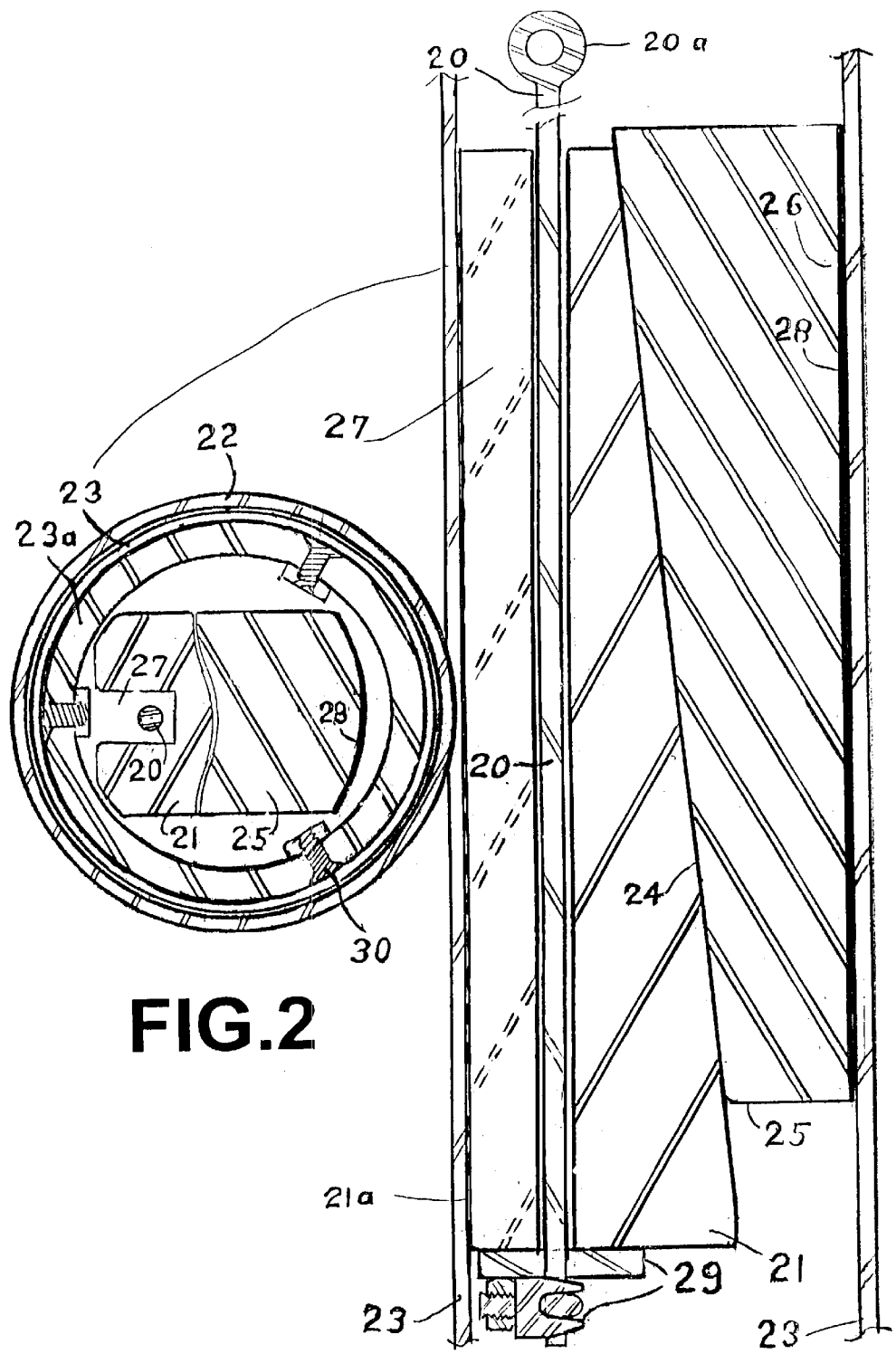

This invention relates to a device for pulling and removing the aluminum tube (DROP TUBE) that is used inside of the 4-inch pipe that extends up from the underground gasoline tanks at service stations. Corrosive sediments settle in around the outside of the tube and on the inside of the 4-inch pipe and wedge it tight. The tube is often destroyed by the efforts of the workers in the process of removing it.

A worker usually drives a crow bar down in between the outer wall of the tube and the inside wall of the 4" pipe. He then pierces through the wall with the crow bar and pries it from side to side and upwardly until it up far enough to get a wrench on it where greater gripping force can be applied to it. The Drop Tube has a float flapper in it to prevent over filling of the tank. It is riveted and glued and sealed to the aluminum tube and it is not practical to try to salvage the valve by removing it from the tube. The cost of new Drop Tube is in the range of $325.–$350. Therefore, being able to remove a tube without destroying it is of significant economic importance.

There is no tool available on the market that I can find that is or has been made to insert into a tube and engage or grip it sufficiently to break it loose when it is stuck tight. Contractors and suppliers that I have contacted to not know of any device that even attempts to do this. Their response was that it is about time.

PRIOR ART

I have not been able to find anything in the prior art that is similar or works like my invention.

Some of the ways I have used this basic principle of a tapered body and a wedging slip is shown in my patents whose numbers follow. The wedging principle was used long before any of my uses. In all of applicant's applications and the one I saw used in the oil industry were used to hold a string of tubing from being pushed out of the oil well casing or to support the weight of the tubing and keep it from moving down into the well. Usually there was a rubber packer that was sealing off between the tubing and the casing do that there was a hydraulic force pushing the tubing one way or the other.

The wedging principle is an effective blocking means to prevent upward or downward movement of the tubing string in an oil well.

In all of the applications and those that I know about, the setting of a wedge into a body has always been either by hydraulic actuation within the tubing or casing or by the machinery of the rig at the surface of the well. In the latter case, it was done by rotating the tubing string and lowering or raising the string vertically and or a combination of the two. With my device a person inserts it into the tube manually by hand and manipulates the setting of the tool by simply pulling straight up on the pulling means which sets it into gripping or contacting engagement with the tube to be removed. It is a tube removing tool that is greatly needed. The forces trying to overpower the wedging mechanism of applicant's device do not originate within the tube as they do in an oil well, but they originate with a person pulling on a pulling means. And further, the pulling means that applicant uses is not intregal with the body of the wedging part as the pulling means is in an oil well.

And further, none of the prior art had a jarring capacity or feature like applicant's devise does. With applicant's devise the setting is done by the hands on installing, pulling and jerking of a personal operator.

Applicant's patent Nos. using a wedging mechanism to block vertical tubing movement in an oil well are: U.S. Pat. Nos. 2,786,534 and 3,045,755 and 3,252,476 and 3,662,824 and 3,299,955 and 3,313,350.

OBJECTS AND ADVANTAGES

The major object of applicant's invention is to provide a device that will operate inside of a tube and grip it sufficiently to allow forces to be transmitted to the tube by the pulling, jarring action exerted by an operator at the surface. The jarring feature is a significant aid in breaking loose a stuck tube without damaging it. It will save the destruction of many tubes. It will save many thousands of dollars. It will save the contractors who have to remove these tubes many ours of labor. It will solve an aggravating problem.

SUMMARY OF THE INVENTION

This devise incorporates a METHOD of manually manipulating a tool that will engage or grip a tube and jar it loose by a unique jarring feature and remove it from its stuck position.

OPERATION OF THE DEVICE

The method of operation is that the operator lowers the pulling means 20 into the tube 23 a few inches. The pulling means 20 carries the body 21 in with it. The wedge 25 follows in behind the body 21 onto the tapered surface 24 of the body 21. The wedge 25 is then trapped between the body 21 and wall of the tube 23. A stop on the bottom end of the pulling means 20 supports the body 21.

The operator pulls up on the pulling means 20 to lift the body 21, which forces it into wedging engagement between the wedge 25 and the wall of the tube 23. The taper 24 on the body 21 and the wedge 25 is a locking taper so when the pulling means 20 is lowered, the body 21, and wedge 25 stay put. Then when the operator pulls upwardly on the pulling means 20 with a fast execration, it creates a much greater peak force than can be obtained by just pulling hard on the pulling means 20.

If the pulling means 20 is a steel cable, the jarring effect is accomplished by using any heavy shaft, pipe or wrench that the operator may have among his tools. The shaft is inserted into a loop 20a at the upper end of the pulling means 20. Then the operator lowers the shaft. Then a fast upward pull on the shaft by the operator creates a peak upward impact on the pulling means and into the body 21 and the tube 23.

DRAWING DESCRIPTION

FIG. 1 is vertical section of the wedge type device as a complete assembly. No 4-inch pipe 22 is shown; only the tube 23 that the device is installed into.

FIG. 2 is a section view looking downwardly through the 4-inch pipe 22 and the tube 23 and the collar 23a. It shows the tapered body 21 passing through the collar 23a.

DETAILED DESCRIPTION

FIGS. 1 and 2 shows a pulling means 20 carries the body 21 into a tube 23.

A body 21 that has one of its sides that is straight 21a and on its opposite side it has an angled tapered surface 24. The body 21 has a slot 27 down through its vertical length to allow the pulling means 20 to pass through it.

A wedge 25 is wedge shaped and has a angled tapered surface 24 of approximately same degree of taper as the taper on the body 21. On its opposite side, it has a straight side 26 that is rounded similar to the inside radius of said tube 23. Attached to the rounded surface is a material 28 that is harder than the tube and which has a rough hard surface that will bit into the tube.

FIG. 1 also shows a loop 20*a* at the top of said pulling means 20.

FIG. 2. Illustrates the 4-inch pipe 22 and the tube 23 inside of it and the collar 23*a*. It shows the nuts on the bolts 30 that protrude into the bore of the tube. It shows the body 21 passing through the collar 23*a*. It shows the pulling means 20 in the slot 27 of the body 21.

I claim:

1. At a gasoline service station that has an underground storage tank and a pipe connected to said storage tank such that it extends up to the ground level, said pipe has an aluminum tube inside of it that is a very close fit which allows fuel to be poured down through it into said tank and at the same time the air in said tank is allowed to vent out of said tank through the space between said pipe line and said tube, whereby said tube gets stuck in said pipe and must be removed, a tube pulling device for insertion into said tube to grip it sufficiently to remove it from its stuck position and which consists of:

a) body that has one end that has a thicker dimension than its opposite end giving it a tapered wedge shape, b) a wedge that has one end that has a thicker dimension than its opposite end giving it a tapered wedge shape, c) a line that extends from above ground level down into said tube and which carries said body down into said tube so that said body is installed into said tube with its thickest end going into said tube first and its thinnest dimension in last so that it presents its flat tapered surface looking up and then said wedge is installed on top if it with it's thinnest end going into said tube first and it's thickest end last so that its flat tapered surface is facing downwardly thereby allowing the said flat tapered surface of said body and the said flat tapered surface of said wedge to contact each other and work against each other forcing each other outwardly against said tube wall thereby gripping it so that when a human operator pulls on said line the pulling forces generated by said operator are transferred to said tube to cause it to be released.

2. A tube pulling device of claim 1 wherein said wedge has a radius on one of its sides that is approximately the same radius as the inside radius of said tube.

3. A tube pulling device of claim 2 wherein said wedge has a gripping material attached to its surface that is harder and or rougher than said tube to provide good gripping effectiveness on said tube wall.

* * * * *